US008544264B2

(12) United States Patent
Anderson

(10) Patent No.: US 8,544,264 B2
(45) Date of Patent: Oct. 1, 2013

(54) PUMP FLOW CONTROL OF HYDRAULIC CIRCUIT AND ASSOCIATED METHOD

(75) Inventor: Eric R. Anderson, Galena, IL (US)

(73) Assignee: Deere & Company, Moline, IL (US)

( * ) Notice: Subject to any disclaimer, the term of this patent is extended or adjusted under 35 U.S.C. 154(b) by 1118 days.

(21) Appl. No.: 11/685,822

(22) Filed: Mar. 14, 2007

(65) Prior Publication Data

US 2008/0223028 A1 Sep. 18, 2008

(51) Int. Cl.
*F16D 31/02* (2006.01)

(52) U.S. Cl.
USPC .......... 60/475

(58) Field of Classification Search
USPC .......... 60/475
See application file for complete search history.

(56) References Cited

U.S. PATENT DOCUMENTS

| | | | | |
|---|---|---|---|---|
| 2,780,063 | A | 2/1957 | Bacchi | |
| 3,186,305 | A | 6/1965 | Lorimer | |
| 3,864,911 | A | 2/1975 | Gellatly et al. | |
| 4,046,270 | A | 9/1977 | Baron et al. | |
| 4,342,164 | A | 8/1982 | Claassen | |
| 4,549,466 | A * | 10/1985 | Hoashi et al. | 60/484 |
| 4,698,761 | A | 10/1987 | Cooper et al. | |
| 4,928,487 | A | 5/1990 | Nikolaus | |
| 4,961,316 | A | 10/1990 | Corke et al. | |
| 5,144,801 | A * | 9/1992 | Scanderbeg et al. | 60/475 |
| 5,179,836 | A | 1/1993 | Dantlgraber | |
| 6,584,769 | B1 | 7/2003 | Bruun | |
| 6,886,332 | B2 | 5/2005 | Kubinski et al. | |
| 6,912,849 | B2 * | 7/2005 | Inoue et al. | 60/475 |
| 2004/0245732 | A1 | 12/2004 | Kotulla et al. | |

OTHER PUBLICATIONS

Stewart et al, Fluid Power, Third Edition [1980) pp. 433-439.*

* cited by examiner

*Primary Examiner* — F. Daniel Lopez

(57) ABSTRACT

A hydraulic circuit comprises a hydraulic cylinder, an accumulator, and a bi-directional variable displacement hydraulic pump for managing flow between a head side of the hydraulic cylinder and both of a rod side of the hydraulic cylinder and the accumulator.

13 Claims, 3 Drawing Sheets

PUMP FLOW CONTROL OF HYDRAULIC CIRCUIT AND ASSOCIATED METHOD

FIELD OF THE DISCLOSURE

The present disclosure relates to flow control in a hydraulic circuit.

BACKGROUND OF THE DISCLOSURE

A hydraulic circuit may be configured to store hydraulic energy for later use. For example, a hydraulic circuit may have one or more accumulators that can store hydraulic energy and subsequently release such hydraulic energy for use in conjunction with one or more functions.

SUMMARY OF THE DISCLOSURE

According to the present disclosure, there is provided a hydraulic circuit capable of hydraulic energy storage and subsequent release. The hydraulic circuit comprises a hydraulic cylinder, an accumulator, and a bi-directional variable displacement hydraulic pump. The hydraulic cylinder has head and rod sides. The pump is positioned fluidly between the head side and both of the rod side and the accumulator to manage flow therebetween. The pump is particularly useful for managing such flow "valvelessly," i.e., without any directional control valve in the hydraulic circuit for managing flow between the head side and both the rod side and the accumulator, thereby avoiding losses typically associated with such valves.

Exemplarily, the pump comprises a piston unit rotatable about a piston unit axis, a swashplate associated with the piston unit and movable about a displacement axis to vary displacement of the pump, and a flow distributor. The flow distributor is configured to control the timing of distribution of flow between a piston of the piston unit (e.g., each piston) and the head side, the rod side, and the accumulator during rotation of the piston unit about the piston unit axis, achieving a torque balance on the swashplate about the displacement axis.

In an example of the flow distributor, the flow distributor has a distributor head port, at least one distributor rod port, and a distributor accumulator port. The distributor head port is fluidly connected to the piston unit and the head side for fluid communication therebetween. The at least one distributor rod port is fluidly connected to the piston unit and the rod side for fluid communication therebetween. Illustratively, the at least one rod port comprises first and second distributor rod ports so fluidly connected. The distributor accumulator port is fluidly connected to the piston unit and the accumulator for fluid communication therebetween.

The flow distributor may be configured as a plate formed to include the distributor head port, the first and second distributor rod ports, and the distributor accumulator port. Exemplarily, the distributor head port is a generally semi-circular arcuate slot formed in the plate, each of the first and second distributor rod ports and the distributor accumulator port is an arcuate slot formed in the plate, and the first and second distributor rod ports and the distributor accumulator port cooperate to define a generally semi-circular shape.

In an exemplary implementation, the hydraulic circuit may be used on a work machine which has a boom. In such a case, the hydraulic cylinder may be attached to the boom for actuation of the boom. It is believed that the hydraulic circuit may be useful in a wide variety of other applications.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
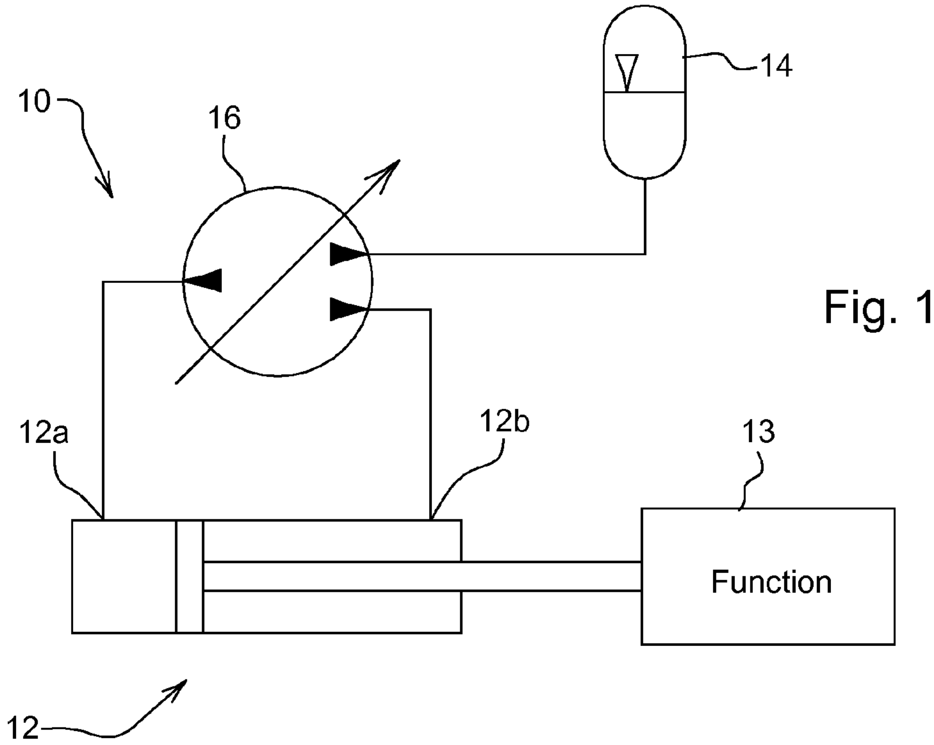
FIG. 1 is a schematic view of a hydraulic circuit having a pump for managing flow of hydraulic fluid between a head side of a hydraulic cylinder and both of a rod side of the hydraulic cylinder and an accumulator.

Referring to FIG. 1, there is shown a hydraulic circuit 10. The hydraulic circuit 10 comprises a hydraulic cylinder 12 for actuating a function 13, an accumulator 14, and a bi-directional variable displacement hydraulic pump 16. The hydraulic cylinder 12 has a head side **12*a* and a rod side 12*b*. The pump 16 is positioned fluidly between the head side 12 and both of the rod side 12*b* and the accumulator 14 to manage flow therebetween. The pump is particularly useful for managing such flow "valvelessly," i.e., devoid of any directional control valve in the hydraulic circuit 10 for managing flow between the head side 12*a* and both of the rod side 12*b* and the accumulator 14**, thereby avoiding losses typically associated with such valves.

Figure 2:
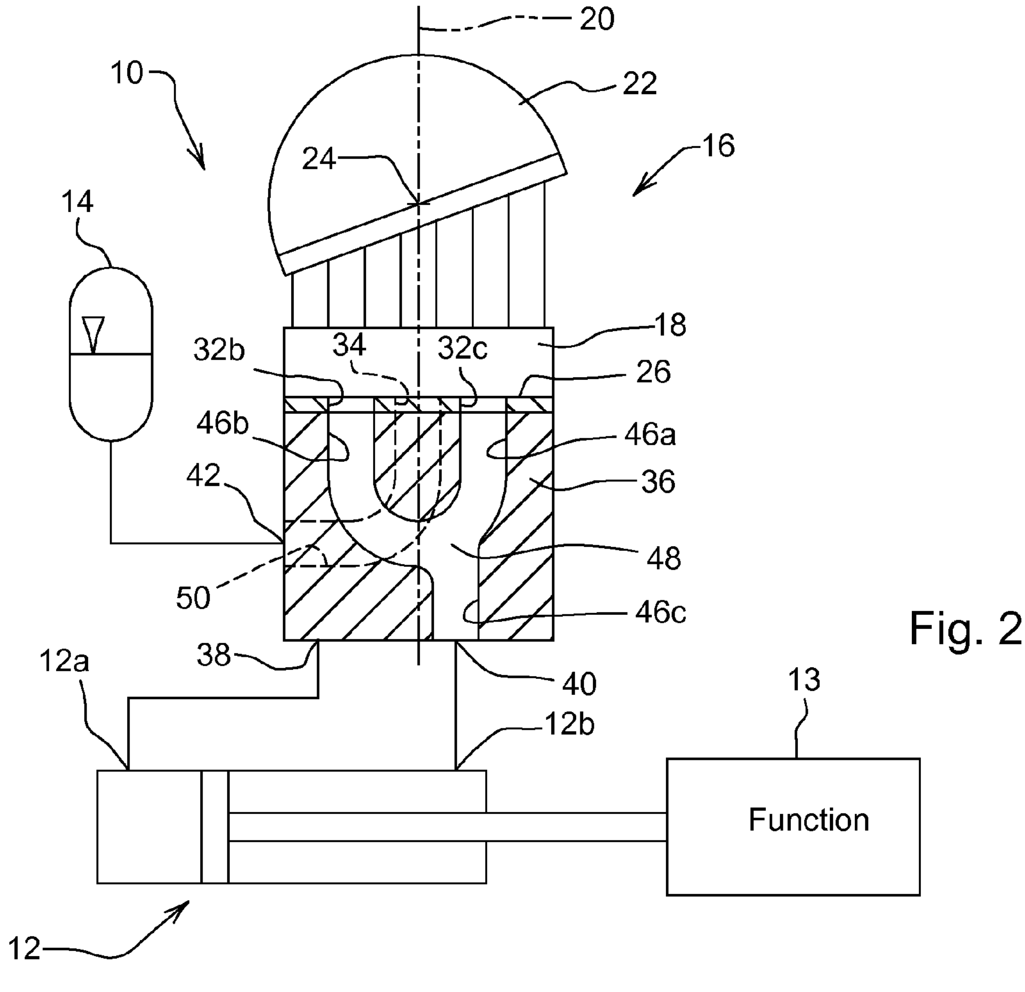
FIGS. 2 and 3 are schematic views showing a flow distributor of the pump fluidly connected to the head and rod sides and the accumulator.

Referring to FIG. 2, the pump 16 exemplarily comprises a piston unit 18 rotatable about a piston unit axis 20 (vertical in FIG. 2 and perpendicular to the page in FIG. 3), a swashplate 22 associated with the piston unit 18 and movable (e.g., rotatable) about a displacement axis 24 (perpendicular to the page in FIG. 2 and horizontal in FIG. 3) to vary displacement of the pump 16, and a flow distributor 26. The flow distributor 26 is configured to control the timing of distribution of flow between pistons of the piston unit 18 and the head side **12*a*, the rod side 12*b*, and the accumulator 14 during rotation of the piston unit 18 about the piston unit axis 20, achieving a torque balance from the pressures on the swashplate 22 about the displacement axis 24**.

Figure 3:
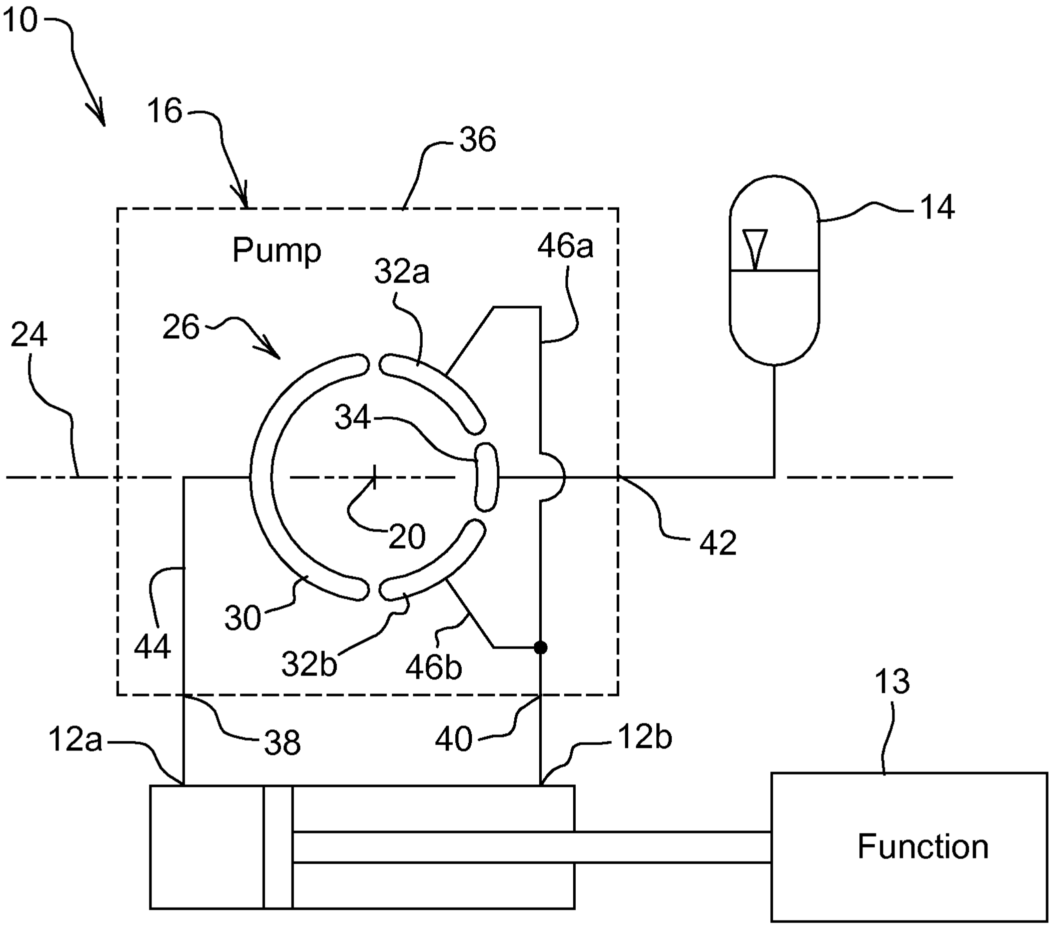

Referring to FIG. 3, the flow distributor 26 has a distributor head port 30, at least one distributor rod port such as first and second distributor rod ports **32*a* and 32*b*, and a distributor accumulator port 34. The distributor head port 30 is fluidly connected to the piston unit 18 and the head side 12*a* for fluid communication therebetween. The first and second distributor rod ports 32*a*, 32*b* are fluidly connected to the piston unit 18 and the rod side 12*b* for fluid communication therebetween. The distributor accumulator port 34 is fluidly connected to the piston unit 18 and the accumulator 14** for fluid communication therebetween.

Figure 4:
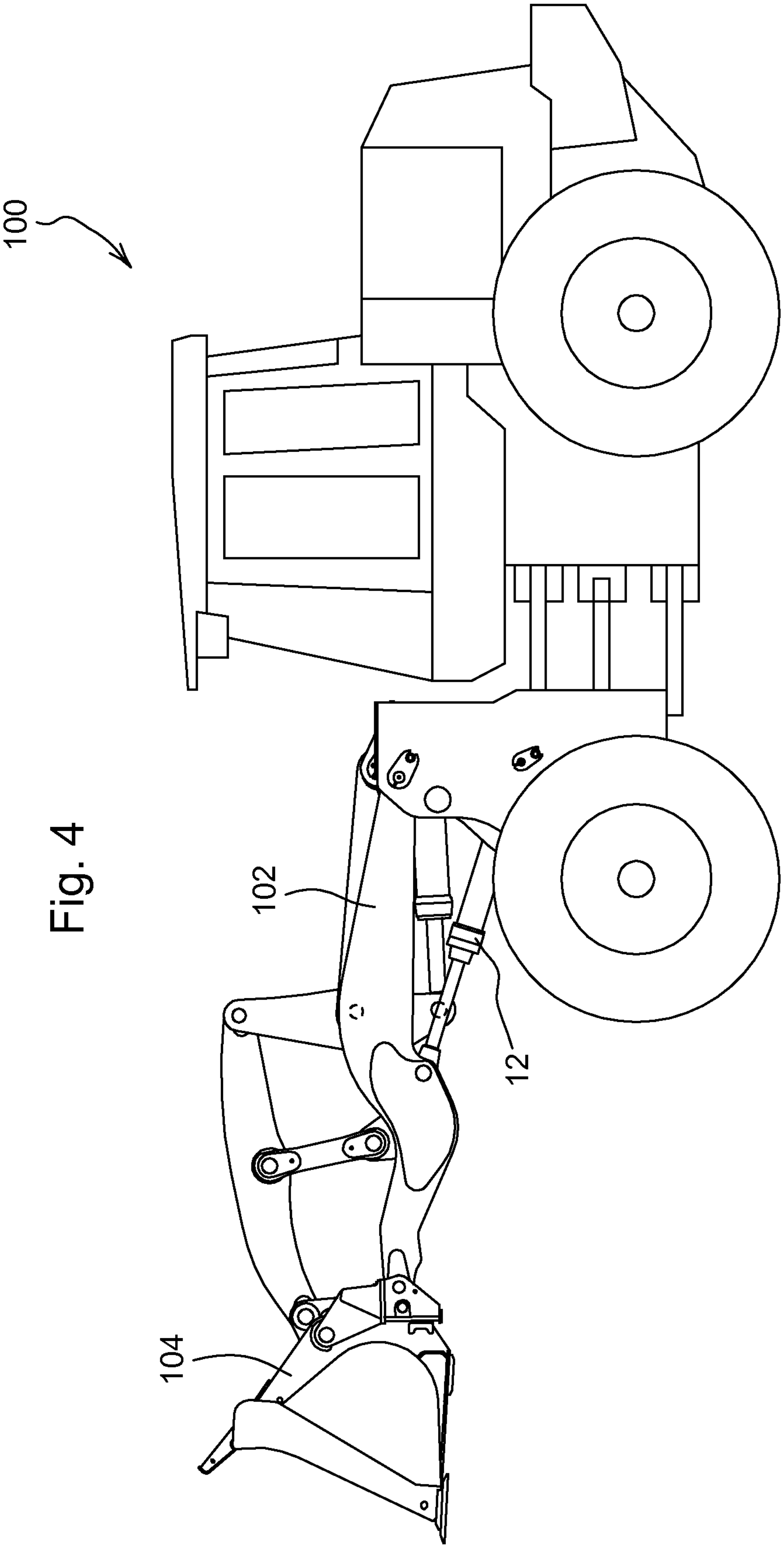
FIG. 4 is a side elevation view showing a work machine on which the hydraulic circuit may be implemented.

To satisfy flow continuity between the head and rod sides **12*a*, 12*b*, an area ratio defined between the head side 12*a* and the rod side 12*b* is substantially equal to an area ratio between the distributor head port 30 and the first and second distributor rod ports 32*a*, 32*b*. This area ratio may be selected so as to be suitable for the particular application. Exemplarily, the area ratio may be about 1.5:1.0 such as for a four-wheel drive loader application in which the cylinder 12 is provided for actuation of a boom thereof (FIG. 4**).

To promote the torque balance of pressures on the swashplate 22, the flow area of the distributor head port 30 is substantially equal to the cumulative flow area of the distributor accumulator port 34 and the distributor rod ports 32*a*, 32*b*. Further, the distributor head port 30 has substantially equal flow areas on opposite sides of the displacement axis 24. Likewise, the distributor accumulator port 34 has substantially equal flow areas on opposite sides of the displacement axis 24. In addition, the first distributor rod port 32*a* and the second distributor rod port 32*b* are of substantially equal flow area and are positioned on opposite sides of the displacement axis 24. The first and second distributor rod ports 32*a*, 32*b* are also positioned on opposite sides of the distributor accumulator port 34. The ports 30, 32*a*, 32*b*, and 34 thus define a symmetric arrangement about the displacement axis 24, providing the torque balance on the swashplate 22.

Regarding the port shapes, each of the distributor head port 30, the first and second distributor rod ports 32*a*, 32*b*, and the distributor accumulator port 34 is an arcuate slot. The arcuate slots cooperate to define a generally circular shape that matches the circular path followed by the pistons upon rotation of the piston unit 18 about the piston unit axis 20. The distributor head port 30 is large enough so as to be generally semi-circular. Together, the first and second distributor rod ports 32*a*, 32*b* and the distributor accumulator port 34 cooperate to define a generally semi-circular shape.

The flow distributor 26 may be configured as a plate. The arcuate slots of the ports 30, 32*a*, 32*b*, and 34 may be formed in the plate as a hole therethrough.

Referring to FIGS. 2 and 3, the pump 16 comprises a housing 36. The housing 36 comprises porting positioned fluidly between the distributor head port 30, the first and second distributor rod ports 32*a*, 32*b*, and the distributor accumulator port 34. Such housing porting includes a housing head port 38 positioned fluidly between the head side 12*a* and the distributor head port 30, a housing rod port 40 positioned fluidly between the rod side 12*b* and the first and second distributor rod ports 32*a*, 32*b*, and a housing accumulator port 42 positioned fluidly between the accumulator 14 and the distributor accumulator port 34.

The housing 36 further comprises internal passageways interconnecting the distributor and housing ports. In particular, a head passageway 44 interconnects the distributor head port 30 and the housing head port 38. First and second rod passageways 46*a*, 46*b* leading from the rod distributor ports 32*a*, 32*b*, respectively, join at a junction 48 to form a combined rod passageway 46*c* leading to the housing rod port 40. An accumulator passageway 50 interconnects the distributor accumulator port 34 and the housing accumulator port 42.

Referring to FIG. 4, in an exemplary implementation, the hydraulic circuit 10 may be used on a work machine 100 which has a boom 102 with a work tool 104 attached to an end thereof. In such a case, the hydraulic cylinder 12 may be attached to the boom 102 for actuation of the boom 102. Illustratively, the work machine 100 may be embodied as a four-wheel drive loader having the boom 102 for raising and a lowering the bucket 104 of the loader. However, it is believed that the hydraulic circuit 10 may be useful in a wide variety of other applications as well. The pump 16 is able to provide the flow management between the head side 12*a* and both of the rod side 12*b* and the accumulator 14, without the use of a directional control valve in the circuit 10 for such purpose.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A hydraulic circuit, comprising:

a hydraulic cylinder comprising a head side and a rod side, an accumulator, and a bi-directional variable displacement hydraulic pump positioned fluidly between the head side and both of the rod side and the accumulator to manage flow therebetween, the pump comprising a piston unit rotatable about a piston unit axis, a swashplate associated with the piston unit and movable about a displacement axis to vary displacement of the pump, and a flow distributor configured to control the timing of distribution of flow between a piston of the piston unit and the head side, the rod side, and the accumulator during rotation of the piston unit about the piston unit axis achieving a torque balance on the swashplate about the displacement axis, the flow distributor comprising a distributor head port fluidly connected to the piston unit and the head side, first and second distributor rod ports fluidly connected to the piston unit and the rod side, and a distributor accumulator port fluidly connected to the piston unit and the accumulator, the distributor accumulator port is positioned between the first and second distributor rod ports, the distributor head port has a flow area substantially equal to a cumulative flow area of the distributor accumulator port and the first and second distributor rod ports, the distributor head port has substantially equal flow areas on opposite sides of the displacement axis, the distributor accumulator port has substantially equal flow areas on opposite sides of the displacement axis, and the first distributor rod port and the second distributor rod port are of substantially equal flow area and are positioned on opposite sides of the displacement axis and opposite sides of the distributor accumulator port.

2. The hydraulic circuit of claim 1, wherein the flow distributor is a plate, the distributor head port is a generally semi-circular arcuate slot formed in the plate, each of the first and second distributor rod ports and the distributor accumulator port is an arcuate slot formed in the plate, and the first and second distributor rod ports and the distributor accumulator port cooperate to define a generally semi-circular shape.

3. The hydraulic circuit of claim 1, wherein the pump comprises a housing, the housing comprises a housing head port positioned fluidly between the head side and the distributor head port, a housing rod port positioned fluidly between the rod side and the first and second distributor rod ports, and a housing accumulator port positioned fluidly between the accumulator and the distributor accumulator port.

4. A work machine comprising the hydraulic circuit of claim 1 and a boom to which the hydraulic cylinder is attached for actuation of the boom thereby.

5. A hydraulic circuit, comprising:

a hydraulic cylinder comprising a head side and a rod side, an accumulator, and a bi-directional variable displacement hydraulic pump positioned fluidly between the head side and both of the rod side and the accumulator to manage flow therebetween, the pump comprising a rotatable piston unit, a swashplate movable about a displacement axis to vary displacement of the pump, and a flow distributor configured to control the timing of distribution of flow between a piston of the piston unit and the head side, the rod side, and the accumulator during rotation of the piston unit, the flow distributor comprising a distributor head port fluidly connected to the piston unit and the head side, a plurality of distributor rod ports fluidly connected to the piston unit and the rod side, and a distributor accumulator port fluidly connected to the piston unit and the accumulator, wherein the distributor head port has substantially equal flow areas on opposite sides of the displacement axis, and the plurality of distributor rod ports and the distributor accumulator port cooperate to provide substantially equal flow areas on opposite sides of the displacement axis, and the distributor accumulator port has substantially equal flow areas on opposite sides of the displacement axis and located between the plurality of distributor rod ports.

6. The hydraulic circuit of claim 5, wherein the pump comprises a housing, the housing comprises porting positioned fluidly between the distributor head port, the plurality of distributor rod ports, and the distributor accumulator port.

7. The hydraulic circuit of claim 5, wherein the plurality of distributor rod ports comprises first and second distributor rod ports fluidly connected to the piston unit and the rod side.

8. The hydraulic circuit of claim 7, wherein the distributor accumulator port is positioned between the first and second distributor rod ports.

9. The hydraulic circuit of claim 7, wherein an area ratio defined between the head side and the rod side is substantially equal to an area ratio between the distributor head port and the first and second distributor rod ports.

10. The hydraulic circuit of claim 5, wherein the hydraulic circuit is devoid of any directional control valve for controlling flow between the head side and both of the rod side and the accumulator.

11. A bi-directional variable displacement hydraulic pump for use in a hydraulic circuit comprising a hydraulic cylinder and an accumulator, the hydraulic cylinder comprising a head side and a rod side, the pump adapted to be positioned fluidly between the head side and both of the rod side and the accumulator to manage flow therebetween, the pump comprising:

a rotatable piston unit;

a flow distributor configured to control the timing of distribution of flow between a piston of the piston unit and the head side, the rod side, and the accumulator during rotation of the piston unit, the flow distributor comprising a distributor head port fluidly connected to the piston unit and adapted to be fluidly connected to the head side, a plurality of distributor rod ports fluidly connected to the piston unit and adapted to be fluidly connected to the rod side, and a distributor accumulator port fluidly connected to the piston unit and adapted to be fluidly connected to the accumulator; and a swashplate movable about a displacement axis to vary displacement of the pump, the distributor head port has substantially equal flow areas on opposite sides of the displacement axis, the plurality of distributor rod ports and the distributor accumulator port cooperating to provide substantially equal flow areas on opposite sides of the displacement axis, the distributor accumulator port having substantially equal flow areas on opposite sides of the displacement axis and is positioned between the plurality of distributor rod ports.

12. The hydraulic circuit of claim 11, wherein the plurality of distributor rod ports comprises first and second distributor rod ports, and the first and second distributor rod ports are of substantially equal flow area and are positioned on opposite sides of the distributor accumulator port and opposite sides of the displacement axis.

13. The hydraulic circuit of claim 12, wherein the flow distributor is a plate, the distributor head port is a generally semi-circular arcuate slot formed in the plate, each of the first and second distributor rod ports and the distributor accumulator port is an arcuate slot formed in the plate, and the first and second distributor rod ports and the distributor accumulator port cooperate to define a generally semi-circular shape.

* * * * *